United States Patent [19]

Mandalia et al.

[11] Patent Number: 6,069,891

[45] Date of Patent: May 30, 2000

[54] INTRANET VOICE OVER DATA OPERATOR SERVICE

[75] Inventors: Baiju D. Mandalia; Edward J. Dahmus, both of Boca Raton; Vicki Colson, Deerfield, all of Fla.

[73] Assignee: International Business Machines Corporation, Armonk, N.Y.

[21] Appl. No.: 08/900,431

[22] Filed: Jul. 25, 1997

[51] Int. Cl.[7] ........................................... H04J 3/12
[52] U.S. Cl. .................. 370/352; 370/466; 370/522; 379/265
[58] Field of Search ..................... 370/270, 352, 370/395, 356, 389, 392, 401, 458, 390, 383, 410, 256, 259, 215, 477, 537, 522, 473, 474, 466, 536; 379/265, 260, 142

[56] References Cited

U.S. PATENT DOCUMENTS

| | | | |
|---|---|---|---|
| 5,210,789 | 5/1993 | Jeffus et al. | 379/127 |
| 5,682,386 | 10/1997 | Arimilli et al. | 370/468 |

*Primary Examiner*—Chau Nguyen
*Assistant Examiner*—Kim T. Nguyen
*Attorney, Agent, or Firm*—Quarles & Brady LLP

[57] ABSTRACT

A method for managing operator services comprises the steps of: converting a plurality of voice calls between a public switched telephone network (PSTN) and respective operator work stations in an operator service local area network (LAN) into digital voice data; respectively transmitting the voice data between the PSTN and the respective operator work stations over single digital data transmission lines; respectively transmitting requests for operator services data and operator services data between a data center LAN and respective ones of the operator work stations over the single digital data transmission lines; respectively transmitting operator activity data between an operator registration server on the data center LAN and respective ones of the operator work stations over the single digital data transmission lines; and, multiplexing and demultiplexing the voice data and at least one of the data requests, requested data and the activity data for simultaneous transmission over respective ones of the single digital data transmission lines.

20 Claims, 2 Drawing Sheets

INTRANET VOICE OVER DATA OPERATOR SERVICE

BACKGROUND OF THE INVENTION

1. Field of the Invention

This invention relates generally to the field of telephone operator service, and in particular, to managing communications to and from telephone operator work stations utilizing voice over data technology.

2. Description of Related Art

Callers requesting directory assistance, or other operator services, initiate telephone calls into a public switched telephone network (PSTN). The PSTN routes the telephone calls to an automatic call distributor (ACD). The PSTN and ACD are connected by T1/E1 voice trunk lines for subscribers, which carry voice. The designation T1 is used primarily in the United States of America (USA) to identify a telephone line data carrier having 24 channels over which data can be transmitted at 1.5 megabits per second (MB/sec). The designation E1 is used primarily outside the USA to identify a telephone line data carrier having 32 channels over which data can be transmitted at 2.0 MB/sec.

The ACD monitors operator activity data to identify an available operator and, upon such identification, transfers the call to one of a plurality of operator work stations, provided with a telephone for the operator, via sets of channel banks connected by T1/E1 voice trunk lines which carry voice and switch control data.

One of the channel banks communicates with different ones of the plurality of operator work stations via respective sets of operator switch control lines and operator voice lines. If a T1 trunk line having 24 channels is utilized, for example, then 24 operator work stations can be connected to one of the channel banks by 24 respective sets of operator switch control lines and operator voice lines.

Operators need to access data bases of operator services information, also referred to as caller data information, which the operators supply to the callers, for example a telephone number or a long distance calling rate these data bases include, for example, a listing services information program (LSIP) and a number services information program (NSIP). The data bases form part of a data center local area network (LAN). The data bases of the caller data information are connected to different ones of the operator work stations via a plurality of call processing data routers.

Communications within each of the data center LAN and the operator center LAN typically take place at 16 MB/sec. However, the routers associated with the data center LAN and the operator center LAN communicate with one another via a wide area network (WAN), which transmits data at only 64 Kilobits per second (KB/sec).

The data center LAN also includes a maintenance administration program (MAP) containing operator activity data. Operator activity data includes identification of operators signing on and off of the system, as work shifts and work breaks pass, and also includes identification of which operators are handling service calls in progress and which operators are available to handle new service calls. The MAP is continuously updated by the operator work stations and continuously accessed by the ADC.

It can be appreciated from a brief reference to the prior art operator services system shown in FIG. 1 that separate communications paths are required. One path is for voice and switching data via the trunk lines 24, which can operate at 16 MB/sec. The other path is for the operator services information via the WAN 50, which transmits data at only 64 KB/sec. Moreover, each of the work stations 18 requires two communications interfaces. One interface is with the respective set of operator switch control lines and operator voice lines 26 and 28, for the voice and switch control data. The other interface is with the operator center LAN 48, for the operator services data and operator activity data.

Presently, operators in call centers and local operator centers who need ACD functionality utilize PBXs for the call transfer operations. This requires expensive equipment to maintain and upgrade. Proprietary switch control software is required to monitor status of telephone operators in directory assistance, call center and telephony services. Finally, expensive long distance trunks are required to connect the geographically remote operators to the ACD facility.

Overall, the prior art topology and consequent methodology is complex, inefficient and expensive. A simpler, more efficient and less expensive methodology and topology would satisfy a long felt need to improve delivery of telephone operator services.

SUMMARY OF THE INVENTION

Local area networks and asynchronous transfer mode (ATM) networks are becoming inexpensive and also robust for local data communication. Voice over data is an emerging technology that allows voice to be sent compressed in packet form over data networks.

In accordance with an inventive arrangement, voice over data technology is utilized to manage operator services via intranet data networks. More particularly, and for the first time, a single transport for data, voice and signaling information is utilized, together with selectable multiplexor facilities with network connections, and advantageously, capacity for compressing and decompressing voice.

In accordance with another inventive arrangement, voice over data technology is utilized for communicating to remotely located operator service networks by compressed voice over data. More particularly, the compression of voice allows, for example, a 4 to 1 reduction in the bandwidth required for the T1/E1 trunk lines. Transmitting voice in packetized form allows the voice to be multiplexed together with other data across the remote links. This significantly reduces remote WAN connection costs because a significantly smaller number of long distance trunk lines is needed to communicate with a given number of operators.

In accordance with yet another inventive arrangement, voice over data technology is utilized for communicating between a central operator status server on an intranet, used for storing and updating operation activity data, and an operator services network geographically remote from the status server, using the same long distance trunk lines carrying voice to and from the operator services network.

More particularly, the central status server can be utilized on an intranet to register each operator's personal computer. Using a graphical interface on the terminal, the status of the operator can be registered on this server. The server information enables other applications to check the availability of individual operators. For the first time, a central server registers and maintains operator status information, no special software or hardware is required except standard internet protocol (IP) intranet connections using LAN or modem hardware and parameters that need to be monitored or reported can be changed using open interface.

In accordance with these inventive arrangements, a telephone operator services system can be managed using standard multimedia personal computers as operator work stations, compressed voice and switching (address) data can be transmitted via the same communications path and a centralized status server can register operator status and can communicate with the operator work stations utilizing the same communications path carrying the compressed voice and switching data.

A method for managing operator services, in accordance with an inventive arrangement, comprises the steps of: converting a voice call between a public switched telephone network (PSTN) and a selected operator work station in an operator service local area network (LAN) into digital voice data; transmitting the voice data between the PSTN and the selected operator work station over a single digital data transmission line; transmitting requests for operator services data and requested operator services data between a data center LAN and the selected operator work station over the single digital data transmission line; and, transmitting operator activity data between an operator registration server on the data center LAN and the selected operator work station over the single digital data transmission line.

The method can further comprise the step of multiplexing and demultiplexing the voice data and at least one of the data requests, the requested data and the activity data at opposite ends of the single digital data transmission line.

The multiplexing and demultiplexing step can be performed in a first interface between one end of the single digital data transmission line and each one of the PSTN and the data services LAN and/or in a second interface between an opposite end of the single digital data transmission line and the operator services LAN.

Advantageously, the step of demultiplexing the voice data and at least one of the requested data and the activity data transmitted to the operator services LAN over the single digital data transmission line can be implemented in a switch, for example an asynchronous transfer mode (ATM) switch, the switch directing the demulitplexed streams of the voice data, the requested data and the activity data to the selected work station.

Advantageously, the step of demultiplexing the voice data and at least one of the data requests and the activity data transmitted over the single digital data transmission line from the operator services LAN can be implemented in a voice call and data interface (VCDI), the VCDI routing the demulitplexed voice data to the PSTN and routing the data requests and the activity data to the data center LAN.

In accordance with another inventive arrangement, the method can further comprise the steps of: compressing the converted voice data for transmission over the single data transmission line; and, decompressing the voice data after transmission over the single data transmission line. Advantageously, the compressing and decompressing steps can be implemented, at least in part, in the selected work station and at an end of the single data transmission line remote from the operator services LAN.

A method for managing operator services in accordance with still another inventive arrangement comprises the steps of: converting a plurality of voice calls between a public switched telephone network (PSTN) and respective operator work stations in an operator service local area network (LAN) into digital voice data; respectively transmitting the voice data between the PSTN and the respective operator work stations over single digital data transmission lines; respectively transmitting requests for operator services data and operator services data between a data center LAN and respective ones of the operator work stations over the single digital data transmission lines; and, respectively transmitting operator activity data between an operator registration server on the data center LAN and respective ones of the operator work stations over the single digital data transmission lines.

The method can further comprise the steps of multiplexing and demultiplexing the voice data and at least one of the data requests, requested data and the activity data for simultaneous transmission over respective ones of the single digital data transmission lines.

Advantageously, the multiplexing and demultiplexing step can be performed in a first interface between respective first ends of the single digital data transmission lines and each one of the PSTN and the data services LAN and/or in a second interface between respective second ends of the single digital data transmission lines and the operator services LAN.

Advantageously, the step of demultiplexing the voice data and at least one of the requested data and the activity data transmitted to the operator services LAN over the single digital data transmission lines can be implemented in a switch, for example an asynchronous transfer mode (ATM) switch, the switch directing the demulitplexed streams of the voice data and at least one of the requested data and the activity data to the respective work stations.

Advantageously, the step of demultiplexing the voice data and at least one of the data requests and the activity data transmitted over the single digital data transmission lines from the operator services LAN can be implemented in a voice call and data interface (VCDI), the VCDI routing the demulitplexed voice data to the PSTN and routing the data requests and the activity data to the data center LAN.

In accordance with yet another inventive arrangement, the method further comprises the steps of: compressing the converted voice data for transmission over respective ones of the single data transmission lines; and, decompressing the voice data after transmission over the respective ones of the single data transmission lines. Advantageously, the compressing and decompressing steps can be implemented, at least in part, in the work stations and at an end of the single data transmission lines remote from the operator services LAN.

BRIEF DESCRIPTION OF THE DRAWINGS

There are shown in the drawings forms which are presently preferred, it being understood however, that the inventive arrangements are not limited to the precise arrangements and instrumentalities shown.

DETAILED DESCRIPTION OF THE PREFERRED EMBODIMENTS

Figure 1:
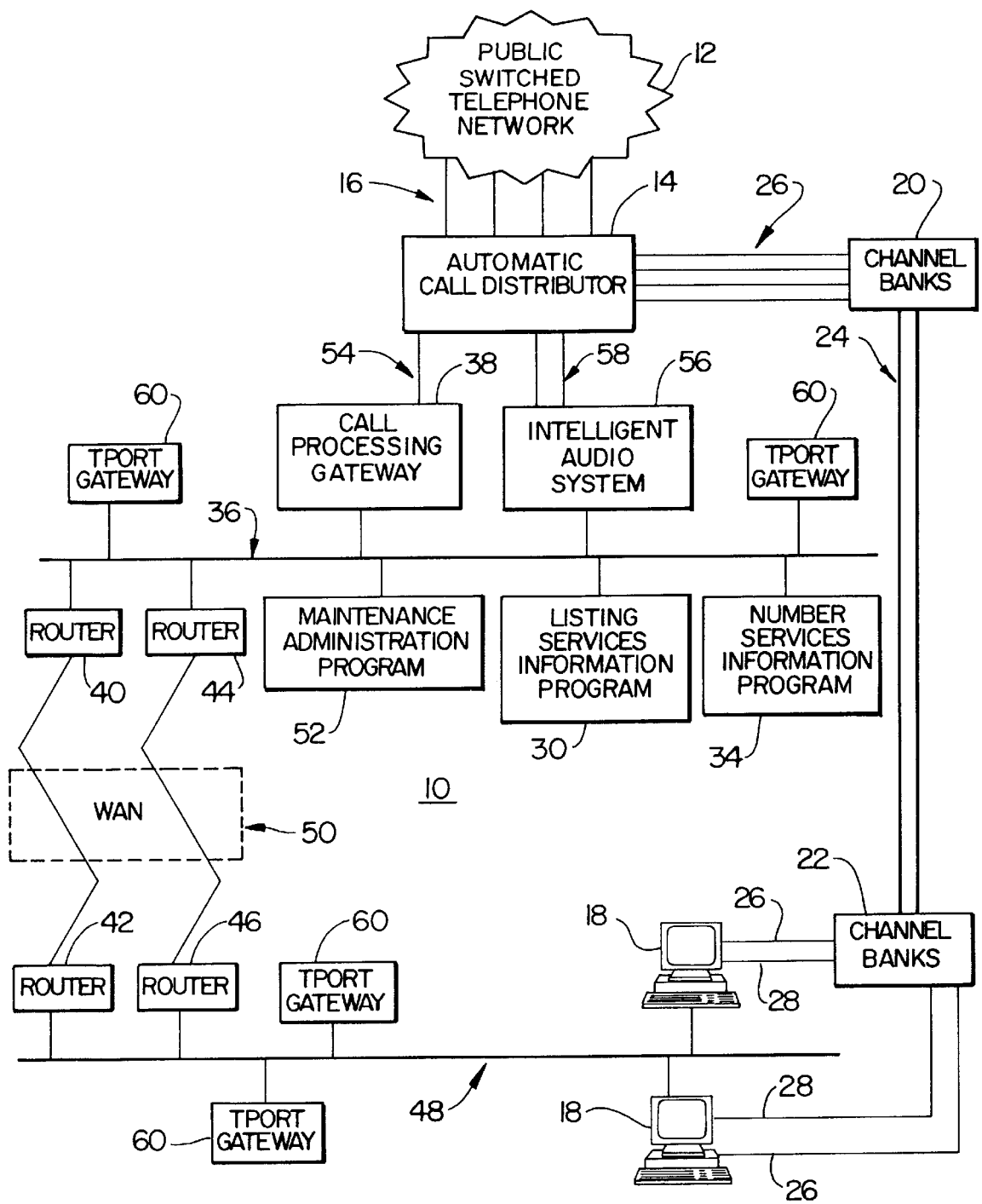
FIG. 1 is a block diagram of a prior art telephone operator services system.

The inventive arrangements taught herein can best be appreciated in contrast to the prior art arrangement for a telephone operator system for providing directory assistance, and other operator services. Such a prior art system 10 is shown in FIG. 1. Callers requesting directory assistance, or other operator services, initiate telephone calls into a public switched telephone network (PSTN) 12. The PSTN 12 routes the telephone calls to an automatic call distributor (ACD) 14. The PSTN 12 and ACD 14 are connected by T1/E1 voice trunk lines 16 for subscribers, which carry voice.

The ACD 14 manages operator activity data. Operator activity data includes identification of operators signing on and off of the system, as work shifts and work breaks pass, and also includes identification of which operators are handling service calls progress and which operators are available to handle new service calls. The ACD 14 uses activity data to identify an available operator and, upon such identification, transfers the call to one of a plurality of operator work stations 18, provided with a telephone for the operator, via a first set of channel banks 20 and a second set of channel banks 22. The work stations can be embodied by personal computers insofar as data must be requested and received, but it must be remembered that the voice communication is independent of the processing and operation of the personal computer, and independent of the interface between each computer and the source of data for each computer. Channel banks 20 and 22 are connected by T1/E1 voice trunk lines 24 which carry voice and switch control data. The ACD 14 and the first set of channel banks 20 communicate with one another by an interface 26 for voice lines and switch data lines for the operators.

The second set of channel banks 22 communicates with different ones of the plurality of operator work stations 18 via respective sets of operator switch control lines 26 and operator voice lines 28.

Operators need to access data bases of operator services information, also referred to as caller data information, which the operators supply to the callers, for example a telephone number or a long distance calling rate. These data bases include, for example, a listing services information program (LSIP) 30 and a number services information program (NSIP) 34. The data bases form part of a data center local area network (LAN) 36.

The ACD 14 also connects the data bases of the caller data information to different ones of the operator work stations 18 via a call processing gateway (CPG) 38, data routers 40 and 42, or alternately, data routers 44 and 46 and an operator center LAN 48. Communications within each of the data center LAN 36 and the operator center LAN 48 typically take place at 16 MB/sec.

However, the data center LAN 36 and the operator center LAN 48 are usually geographically remote from one another. The routers associated with the data center LAN 36 and the operator center LAN 48 communicate with one another via a wide area network (WAN) 50, which transmits data at a much slower rate of 64 KB/sec.

The data center LAN 36 also includes a maintenance administration program (MAP) 52 containing operator activity data. The MAP 52 is continuously updated by the operator work stations.

The ACD 14 and CPG 38 communicate through a computer telephony interface (CTI) 54. The ACD 14 and an intelligent audio system (IAS) 56, forming part of the data center LAN 36, communicate via T1/E1 voice trunk lines 58 for audio response units. The IAS 56 provides stored greetings and other audio messages for making the caller interaction with the operator services data center more user friendly.

The data center LAN 36 and the operator center LAN 48 are further provided with transport (TPORT) gateways 60, which map data at each end of the operator services information communications path.

Figure 2:
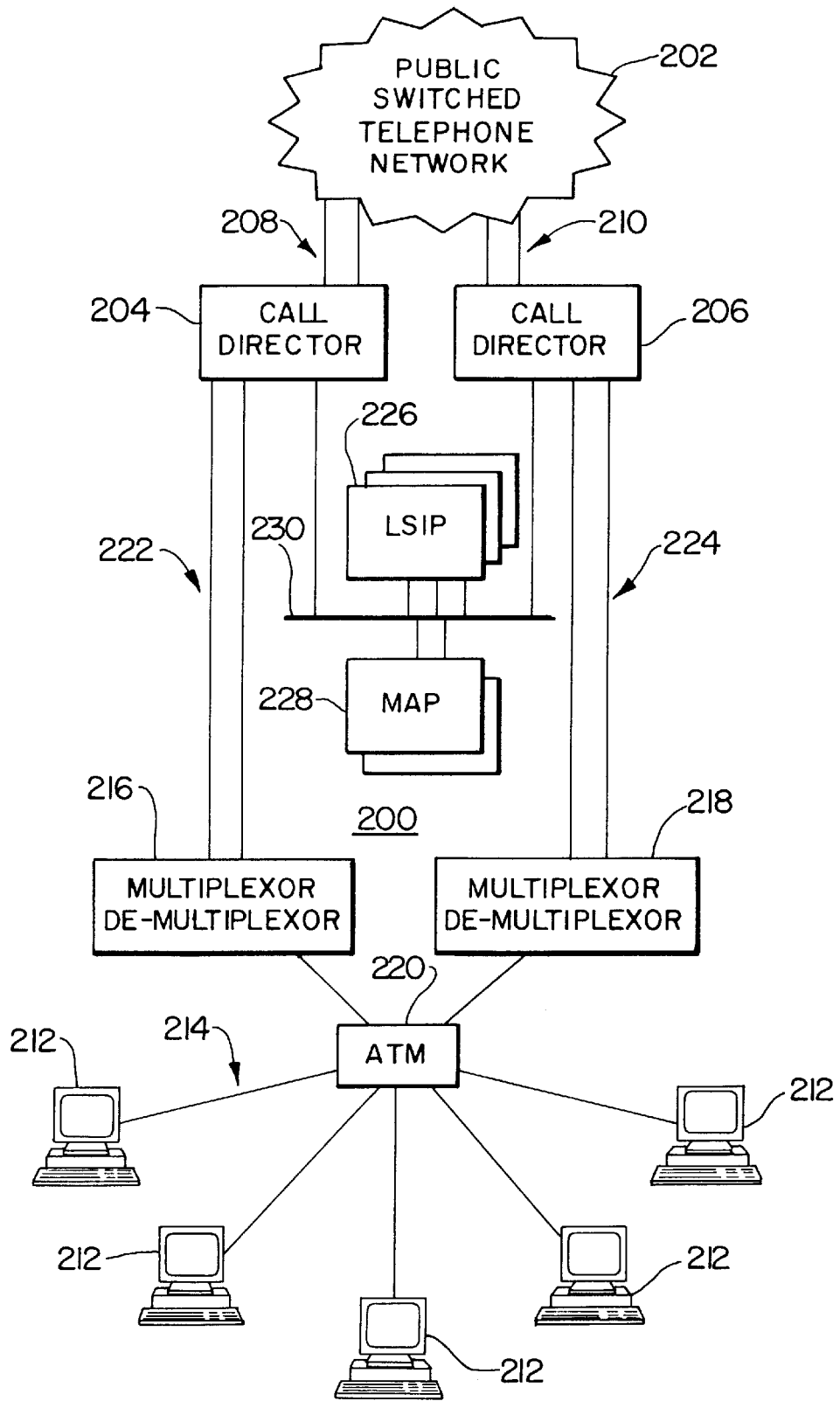
FIG. 2 is a block diagram of an operator services system, in accordance with the inventive arrangements taught herein, which can be managed in accordance with a methodology according to the inventive arrangements taught herein.

FIG. 2 is a block diagram of an operator services system 200, in accordance with the inventive arrangements and methodology taught.

Callers requesting directory assistance, or other operator services, initiate telephone calls into a public switched telephone network (PSTN) 202, corresponding to PSTN 12 in FIG. 1. The PSTN 202 routes the telephone calls one of two call directors 204 and 206. The PSTN 12 and each of the call directors 204 and 206 are connected by T1/E1 voice trunk lines 208 and 210, respectively, for subscribers, which carry voice. The call directors 204 and 206 monitor operator activity data to identify an available operator and, upon such identification, transfers the call to one of a plurality of operator work stations 212, forming an operator center local area network (LAN) 214. Communications within the operator center LAN 214 typically take place at 25 MB/sec. Each call director compresses the voice before transmission to the selected operator work station, preferably into a packetized format. The compressed voice is transmitted to the selected operator work station via one of the multiplexor/demultiplexors (MUX/DEMUX) 216 or 218, and an asynchronous transfer mode (ATM) switch 220, over T1/E1 long distance trunk lines 222 or 224. Each MUX/DEMUX 216 and 218 demultiplexes signals transmitted from the call directors to the operator work stations and multiplexes signals transmitted from the operator work stations to the call directors. The ATM switch 220 is connected to each of the operator work stations 212. Call routing to selected operator work stations is controlled in the ATM switch 220 by address information in the headers of the compressed voice packets.

The call directors 204 and 206 also connect the data bases of the caller data information to different ones of the operator work stations via the same communications path just described, namely one of the multiplexor-demultiplexors (MUX/DEMUX) 216 or 218, the asynchronous transfer mode (ATM) switch 220, and the T1/E1 long distance trunk lines 222 or 224. This may be contrasted with the system shown in FIG. 1, which requires a separate wide area network, a plurality of routers and a plurality of transport gateways to transmit operator services data at significantly lower data transmission rates than those of the LANs and the T1/E1 trunk lines.

The data bases include, for example, a listing services information program (LSIP) 226, a number services information program (NSIP), not shown, and a maintenance administration program (MAP) 228 containing operator activity data. The NSIP and MAP 228 similar to the NSIP 34 and MAP 52 described in connection with FIG. 1.

The call directors 204 and 206 and the data bases form part of a data center local area network (LAN) 230. This may be contrasted with the automatic call distributor in FIG. 1, which required the call processing gateway to communicate with the data center LAN. Each of the call directors can also be thought of as a voice and data interface, with respect to the PSTN and the single digital data transmission lines.

The data center LAN 230 can also include an intelligent audio system, not shown, similar to the IAS 56 in FIG. 1, although this function is preferably implemented in another personal computer forming part of the data center LAN 230. Communications within the data center LAN 230 typically take place at 16 MB/sec.

Each work station 212 can be a standard consumer multimedia personal computer, available from a number of sources, including IBM® Corporation. Such a work station can operate with, for example, a 166 MHZ Inte R; Pentium® or equivalent processor. Each work station can have a standard operating system like Windows 95®, OS/2® or Windows® 3.11. The multimedia built-in standard sound/ audio functions are necessary to allow for the operator headset and microphone to be connected. Each computer work station requires only one interface to receive both voice and data, as contrasted with the need for dual computer interfaces in the prior art system shown in FIG. 1. Each work station 212 has special software that presents a graphical interface to the operator for processing voice calls, for providing voice compression and decompression of the voice calls while integrating with the sound and audio functions of the multimedia PC and for performing the transmission of the voice information, using the internet protocol for communication with the call directors 204 and 206. Advantageously, latency in the voice traffic can be minimized by using very small buffers while maintaining acceptable quality voice for conversions with callers. A headset is advantageously used with the multimedia PC, via a standard phone jack, for the convenience of the operator.

The status of each operator is registered within the call directors using standard internet protocol (IP) based intranet software, via the same network over which the other data and voice are communicated. All use the same underlying IP network. The information in this server is utilized by the call directors to route the voice to respective operator work stations.

The call directors provide numerous functions. Each call director: controls call flow; controls call processing resources; compresses voice sent to call processing resources; decompresses voice received from call processing resources; multiplexes voice and data into digital data streams; demultiplexes voice and data from digital data streams; provides ATM and/or Token ring connectivity for local call processing resources and, provides T1/E1 connectivity for remote call processing resources.

The compression of voice allows, for example, a 4 to 1 reduction in the bandwidth required. The call director to the demultiplexor connections are T1/E1 links. Sending the voice in packetized form allows the voice to be sent together with other data across the remote links. This allows for significant reduction in remote wide area connections costs.

It will be appreciated that the inventive arrangements can be implemented using only one of the two call directors and only one of the two multiplexor/demultiplexors shown in FIG. 2. The use of parallel communication paths between the data center LAN and the PSTN, on the one hand, and the operator services LAN on the other hand, serves to illustrate how the number of operator work stations in the operator services center LAN can be significantly increased with minimal additional costs and minimal complexity of the system topology. This cost advantage is emphasized, for example, by the ability of one ATM switch to handle at least two parallel communication paths.

The long felt need to improve delivery of telephone operator services with simpler, more efficient and less expensive methodology and topology is clearly satisfied by the inventive arrangements taught herein.

What is claimed is:

1. A method for managing operator services, comprising the steps of:
   converting a voice call between a public switched telephone network (PSTN) and a selected operator work station in an operator center local area network (LAN) into digital voice data;
   transmitting said voice data between said PSTN and said selected operator work station over a single digital data transmission line;
   transmitting caller data information and operator requests for caller data information between a data center LAN and said selected operator work station over said single digital data transmission line; and,
   transmitting operator activity data for identifying an available operator between an operator registration server on said data center LAN and said selected operator work station over said single digital data transmission line.

2. The method of claim 1, further comprising the step of multiplexing and demultiplexing said voice data and at least one of said requests for caller data information, said caller data information and said operator activity data.

3. The method of claim 2, wherein said multiplexing and demultiplexing step is performed in a voice and data interface between said single digital data transmission line and said operator center LAN.

4. The method of claim 2, wherein said multiplexing and demultiplexing step is performed in a voice and data interface between said single digital data transmission line and each one of said PSTN and said data services LAN.

5. The method of claim 2, wherein said multiplexing and demultiplexing step is performed in a first voice and data interface between one end of said single digital data transmission line and each one of said PSTN and said data services LAN and in a second voice and data interface between an opposite end of said single digital data transmission line and said operator center LAN.

6. The method of claim 1, further comprising the sum of demultiplexing said voice data and at least one of said requested data and said activity data transmitted to said operator services LAN over said single digital data transmission line in a switch, said switch directing said demultiplexed streams of said voice data, said requested data and said activity data to said selected work station.

7. The method of claim 6, wherein said demultiplexing step is implemented in an asynchronous transfer mode (ATM) switch.

8. The method of claim 1, further comprising the step of demultiplexing said voice data and at least one of said requests for caller data information and said operator activity data transmitted over said single digital transmission line from said operator center LAN in a voice and data interface, said voice and data interface routing said demultplexed voice data to said PSTN and routing said requests for caller data information to said data center LAN.

9. The method of claim 1, further comprising the steps of:
   compressing said converted voice data for transmission over said single data transmission line; and,
   decompressing said voice data after transmission over said single data transmission line.

10. The method of claim 9, wherein said compressing and decompressing steps are implemented in said selected work station and at an end of said single data transmission line remote from said operator services LAN.

11. A method for managing operator services, comprising the steps of:
    converting a plurality of voice calls between a public switched telephone network (PSTN) and respective operator work stations in an operator center local area network (LAN) into digital voice data;
    respectively transmitting said voice data between said PSTN and said respective operator work stations over single digital data transmission lines;
    respectively transmitting requests for caller data information and caller data information between a data center LAN and respective ones of said operator work stations over said single digital data transmission lines; and,
    respectively transmitting operator activity data for identifying an available operator between an operator registration server on said data center LAN and respective ones of said operator work stations over said single digital data transmission lines.

12. The method of claim 11, further comprising the steps of multiplexing and demultiplexing said voice data and at least one of said requests for caller data information, requested caller data information and said operator activity data for simultaneous transmission over respective ones of said single digital data transmission lines.

13. The method of claim 12, wherein said multiplexing and demultiplexing step is performed in a voice and data interface between said single digital data transmission lines and said operator center LAN.

14. The method of claim 12, wherein said multiplexing and demultiplexing step is performed in a voice and data interface between said single digital data transmission lines and each one of said PSTN and said data services LAN.

15. The method of claim 12, wherein said multiplexing and demultiplexing step is performed in a first voice and data interface between respective first ends of said single digital data transmission lines and each one of said PSTN and said data services LAN and in a second voice and data interface between respective second ends of said single digital data transmission lines and said operator services LAN.

16. The method of claim 11, further comprising the step of demultiplexing said voice data and at least one of said requested caller data information and said operator activity data transmitted to said operator center LAN over said single digital data transmission lines in a switch, said switch directing said demulitplexed streams of said voice data and at least one of said requested caller data information and said operator activity data to said respective operator work stations.

17. The method of claim 16, wherein said demultiplexing step is implemented in an asynchronous transfer mode (ATM) switch.

18. The method of claim 11, further comprising the step of demultiplexing said voice data and at least one of said requests for caller data information and said operator activity data transmitted over said single digital data transmission lines from said operator center LAN in a voice and data interface, said voice and data interface routing said demulitplexed voice data to said PSTN and routing said requests for caller data information and said operator activity data to said data center LAN.

19. The method of claim 11, further comprising the steps of:
  compressing said converted voice data for transmission over respective ones of said single data transmission lines; and,
  decompressing said voice data after transmission over said respective ones of said single data transmission lines.

20. The method of claim 19, wherein said compressing and decompressing steps are implemented in said work stations and at an end of said single data transmission lines remote from said operator services LAN.

* * * * *